Dec. 7, 1926.
C. J. TROPPMAN
1,609,895
LENS EXAMINING INSTRUMENT
Filed Dec. 26, 1922  2 Sheets-Sheet 1
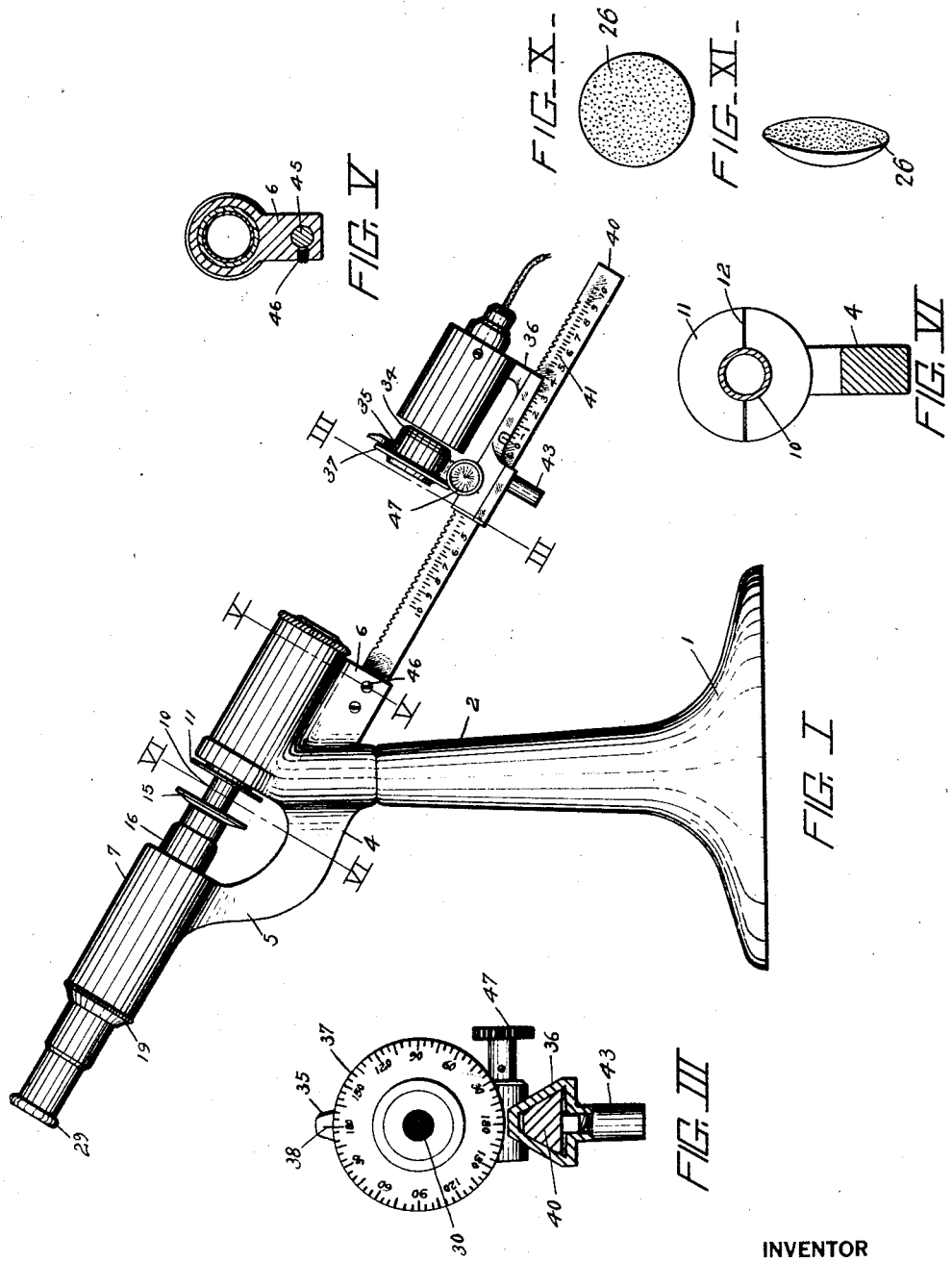
INVENTOR
CHARLES J. TROPPMAN
BY
ATTORNEYS Dec. 7, 1926.
C. J. TROPPMAN
LENS EXAMINING INSTRUMENT
Filed Dec. 26, 1922
1,609,895
2 Sheets-Sheet 2
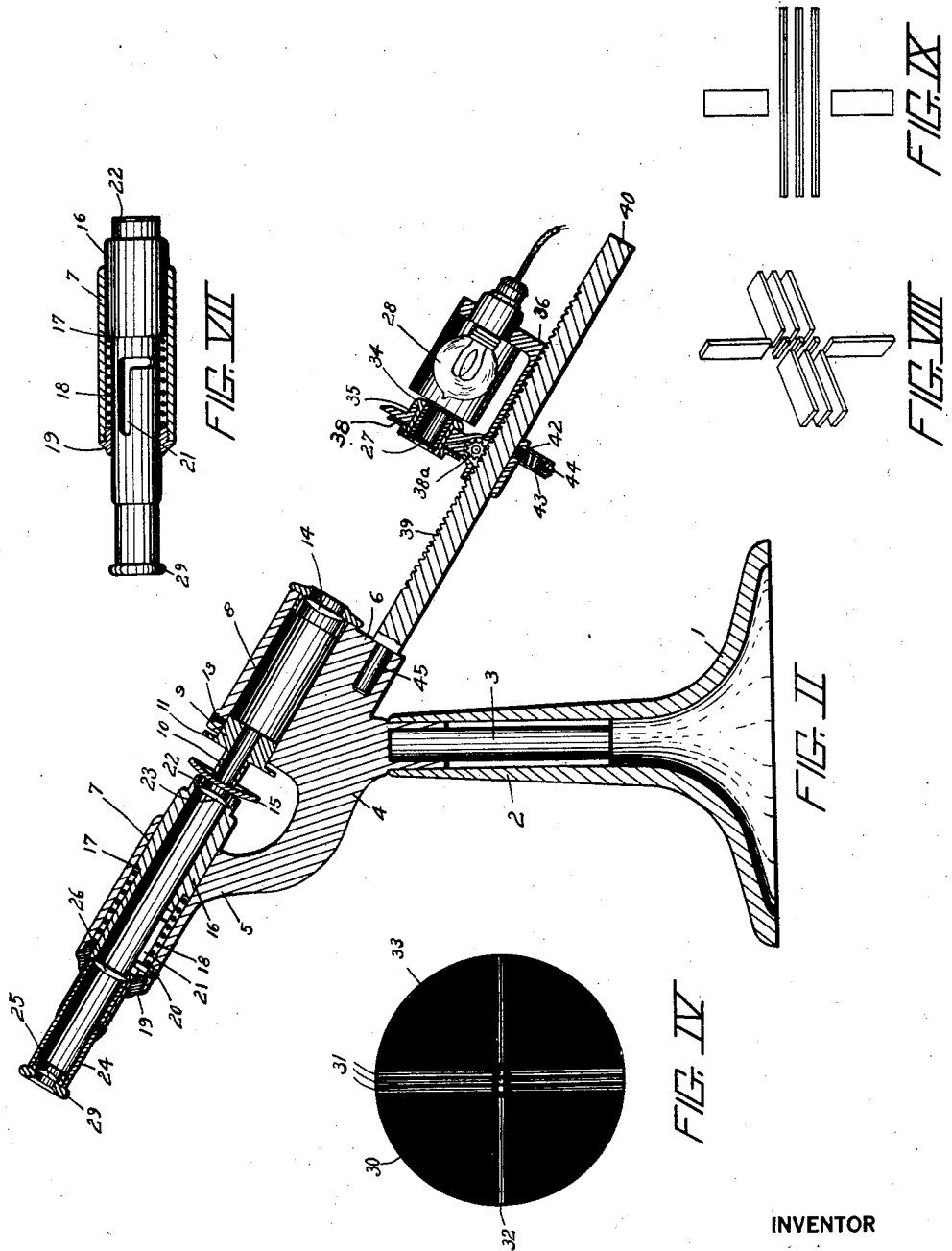
INVENTOR
CHARLES J. TROPPMAN
BY
ATTORNEYS Patented Dec. 7, 1926.

1,609,895

UNITED STATES PATENT OFFICE.

CHARLES J. TROPPMAN, OF CHICAGO, ILLINOIS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-EXAMINING INSTRUMENT.

Application filed December 26, 1922. Serial No. 608,957.

This invention relates to improvements in lens examining instruments and has particular reference to a novel and improved form of instrument for use in testing the vertex focal value or values of ophthalmic lenses.

One of the principal objects of the present invention is the provision of a relatively simple and inexpensive instrument which shall determine the effective power or powers of an ophthalmic lens in a quick and accurate manner.

A further object of the invention is the provision of an instrument of this character so constructed and designed that both power and axis of a sphero-cylinder, toric or like lens may be easily determined.

Other objects of the invention include the provision in an instrument of this character, of means for readily positioning and holding the lens during the testing operation and means to prevent looseness or undue play of the adjustable parts tending to interfere with the accuracy of the instrument.

Other objects and advantages of the present invention should be readily apparent by reference to the following specification taken in connection with the accompanying drawings and it will be understood that I may make any modification in the specific details of construction shown and described within the scope of the appended claims without departing from or exceeding the spirit of my invention.

Figure I is a side elevation of an instrument embodying my improvements.

Figure II is a longitudinal sectional view thereof.

Figure III is a sectional view taken as on the line III—III of Figure I.

Figure IV is a view of the target employed in the testing.

Figure V is a sectional view as on the line V—V of Figure I.

Figure VI is a sectional view on the line VI—VI of Figure I.

Figure VII is a fragmentary sectional view illustrating the means by which the combination viewing and lens holding member is secured in released position.

Figure VIII is a view of the image of the target as seen when the instrument is correctly set as to focus but not axis in testing a cylindrical lens, and Figure IX is a view of the image when the instrument is set in the proper axis.

Figure X is a view of the lens 26, showing the flat surface thereof, which is provided with a translucent or ground face.

Figure XI is a perspective view of the lens 26, showing the convexed and translucent faces.

In the drawings the numeral 1 designates the base portion of the standard of my improved instrument having rising therefrom the tubular standard or support 2 in which is rotatably engaged the trunnion 3 carried by the head 4 which is disposed at an angle to the base to throw the upper or eye piece portion of the instrument in most satisfactory position for use. This head 4 has a pair of arms or branch portions 5 and 6 with the aligned bores or passages 7 and 8 respectively. Secured at the upper portion or terminus of the passage 8 is a plug 9 bearing the projecting tube or lens support 10 and the intermediate flange portion 11. This flange portion 11, as is shown in Figure VI, bears the center line or graduations 12 for use in horizontally lining up a lens resting against the tube. This plug 9 is secured in adjusted position in the bore 8 as by the set screw 13 permitting of adjustment of the plug to bring the upper or lens engaging end of the tube 10 the exact proper distance from the lens 14 at the opposite end of the passage 8 so that the lens 15 being tested will be properly measured as of effective power at the back or tube engaging face of the lens.

Slidably mounted within the portion 7 of the upper arm 5 of the instrument is the tubular casing 16 having the shoulder 17 against which bears the compression spring 18 whose other end bears against the collar 19 at the upper end of the passage tending to urge the casing downward in the direction of the tube 10. A pin 20 riding in the L shaped slot 21 of the casing 16 serves to limit both upward and downward sliding movement of the casing within the head 5 while when the casing is withdrawn the short leg of the L will serve to lock and hold the casing in retracted position. This casing bears at its lower end the rubber ring or washer member 22 which under the influence of the spring 18 clampingly engages the lens 15 and holds it in position against the end of the tube 10, as is clearly illustrated in Figure II. The casing further bears at its lower end adjacent the lens to be tested a lens member 23 while at its upper end is the telescope or image viewing portion including the lenses 25 and 26 so disposed and of such power as to image only parallel rays of light, the image from the target portion of the instrument being projected through the lens 14, the lens 15 being tested and the lens 23 to form a suitable image and the telescope 24 being disposed to receive and enlarge this image when the instrument is in proper adjustment.

In some instances it is prefered to have an image on a screen instead of an image in space between the lenses and in this event the lens 26 is constructed to serve a double purpose in that it is made of plano convex form with the plano side in the direction of the lens 15 being tested and disposed in the image plane of the instrument so that when the instrument is set at zero in the absence of a lens to be tested or with the instrument in proper adjustment in the presence of a lens to be tested the image of the target at 27 as illuminated by the light 28 will be projected onto the front face of the lens 26, this front face having a ground but unpolished surface forming a ground glass screen to receive the image of the target while the opposite face of the lens serves in conjunction with the lens 25 of the telescope portion 24 to give proper magnification to the image so that it is readily visible at the eye piece 29.

The target 27 as shown particularly in Figure IV, consists of an opaque disc 30 having in one meridian the illuminated lines 31 and in the opposite meridian the line 32, while the central portion is preferably formed with three illuminated squares as at 33, these squares being located at the intersection of the lines 31 and 32 but having a surrounding opaque portion separating them from these lines. When the instrument is being employed for testing spherical lenses the entire image of the target will appear first blurred and then become clear and clean cut as the instrument is brought into focus.

In the testing of the cylindrical lenses, however, there are many points to be considered and a clear image in either meridian cannot be obtained until the instrument is set at the proper axis. The axial adjustment of the target is accomplished by rotation of the target carrying sleeve 34 within the carrier 35 which is mounted on the slide 36. The sleeve 34 has a protractor scale 7 with which a witness mark 38 on the member 35 cooperates to indicate the axial or rotary adjustment of the target.

In Figures VIII and IX, I have shown contrasting views indicating the image as seen when the instrument is properly adjusted for focal value of one meridian of a sphero-cylinder lens but off axis and the corresponding appearance when it is changed to the proper axis. It will be noted that, as indicated in Figure VIII, when the instrument is off axis the lines will appear as thin plate-like members viewed in perspective and broken at the center where the squares 33 are located, while when the protractor and target are rotated so that the target axis properly corresponds with the axis of the lens the center squares will disappear and all that will be seen will be either one or three continuous straight lines depending on which set of lines corresponds with the axis of the cylinder for the particular power adjustment. One power and axis adjustment having been located it is then merely necessary to rotate the handle 47 and thus the pinion 38$^a$ when on account of the mesh of this pinion with the rack portion 39 of the carrier bar 40 the slide 36 will be shifted along the bar, the shifting of the target and light changing the readings of the instrument and the slide being shifted until the opposite set of line or lines on the target appear with equal clarity. The reading may then be taken from the diopter scale 41 of the power of the lens in that meridian as should be readily understood by reference to Figure I.

I call particular attention to the fact that the bar 40 is made of substantially frustro-triangular shape in cross section and the slide of substantially corresponding shape while a friction spring pressed plunger member 42 carried in the handle casing 43 at the bottom of the slide with the opposite end of the spring bearing against the plug 44 of the handle draws the slide downward against the tapering sides of the carrier or support, which engaging tapering sides of the bar and the carrier constitute geometrical bearing points, thereby eliminating any play or loose fit of the parts while the plunger 42 at the same time serves as a friction brake to hold the slide or carrier in any desired adjusted position. This bar itself is formed with a cylindrical reduced end 45 fitting in a socket in the head 4 and clamped in position as by the set screws 46 which permit of its initial rotative adjustment to bring the center of the target into exact axial alignment with the remainder of the optical system, so that the instrument may be initially set up in a most simple and efficient manner.

From the foregoing description taken in connection with the accompanying drawings the construction of my improved lens testing instrument should be readily apparent and it will be seen that I have provided a simple and inexpensive device in which the lens may be readily placed in position on the tube 10 and clamped by the combined holder and telescope member and which by either grasping of the handle 43 or rotation of the member 47 the target slide bearing the illuminated target may be adjusted back and forth to compensate for the power of the lens being tested. In testing a sphere or the power of the lens being tested in one meridian in the case of a cylinder the compensation shall be recorded on the diopter scale on the slide and is determined by the clarity with which the image appears at the eye piece; that the target itself may be easily manually rotated according to the position of the axis of the lens being tested, and that when the axis and power in one meridian have been determined power in the other meridian may be determined by simply shifting back and forth of the carrier slide until the opposed target image in the opposite meridian appears clearly.

I claim:

1. A lens testing instrument including a support for the lens to be tested, a split lens system on opposite sides of the lens to be tested for aiding in producing an image through the lens, a target provided with means causing a definite image to be produced, the target being adjustable in directions toward and from the lens to be tested, and means for rotatably mounting the target whereby, together with the first target adjustment, the image produced through the lens to be tested may be varied according to the corresponding relation between the target axis and the axis of the lens to be tested.

2. A lens testing instrument including a support for the lens to be tested, a split lens system on opposite sides of the lens to be tested for aiding in producing an image through the lens, a target provided with means causing a definite image to be produced, the target being adjustable in directions toward and from the lens to be tested, means for rotatably mounting the target whereby, together with the first target adjustment, the image produced through the lens to be tested may be varied according to the corresponding relation between the target axis and the axis of the lens to be tested, and means for viewing the projected image of the target, said viewing means including a lens having a translucent face located at the image plane of the instrument.

3. A lens testing instrument including a support for the lens to be tested, a split lens system on opposite sides of the lens to be tested for aiding in producing an image through the lens, a target provided with means causing a definite image to be produced, the target being adjustable in directions toward and from the lens to be tested, means for rotatably mounting the target whereby, together with the first target adjustment, the image produced through the lens to be tested may be varied according to the corresponding relation between the target axis and the axis of the lens to be tested, and means for viewing the projected image of the target, said viewing means including a lens having a translucent face located at the image plane of the instrument, said lens with its translucent face having its opposite face formed to magnify the image.

4. In an instrument of the character described, a carrier bar of substantially frustro-triangular shape in cross section, a correspondingly shaped target bearing slide on the bar, a shifting handle for the slide and a frictional locking mechanism contained within the handle, said frictional mechanism resiliently bearing against the base of the bar to draw the slide downward into wedging engagement therewith.

5. In an instrument of the character described, a carrier bar of substantially frustro-triangular shape in cross section, a correspondingly shaped target bearing slide on the bar, a shifting handle for the slide and a frictional locking mechanism contained within the handle, said frictional mechanism resiliently bearing against the base of the bar to draw the slide downward into wedging engagement therewith and the top of the bar having a rack portion and a pinion on the slide engaging said rack whereby rotation of the pinion will serve to shift the slide along the bar.

6. In an instrument of the character described, the combination with a furcated supporting head having axially aligned passages formed through its furcations, of a plug fitting in one of the passages and having a projecting tubular portion forming a lens support, a telescope member slidable in the other passage, and means for resiliently actuating the telescope member in the direction of the tubular support to clamp a lens in testing position between said parts.

7. A lens testing instrument, including a target guide, a target base support having a target guide, a target base mounted for adjustment on the guide, the base and guide having geometrical bearings, resilient means carried by and operatively engaging said guide to maintain the bearings in engagement and thereby hold the target in desired adjusted positions.

8. In a lens testing instrument, the combination with a support, including a guide, of a target providing a definite image to be produced, and having a base mounted for adjustment on the guide, the base and the guide having geometrical bearing points, and means carried by the base and operatively engaging with said guide to maintain engagement of the bearing points and hold the target in desired adjusted positions.

9. In a lens testing instrument, the combination with a support, including a guide, of a target providing a definite image to be produced, and having a base mounted for adjustment on the guide, the base and the guide having geometrical bearing points, means carried by the base and operatively engaging with said guide to maintain engagement of the bearing points and hold the target in desired adjusted positions, and manual means carried by the base and operatively connecting with the guide for adjusting said target base.

10. In a lens testing instrument, the combination with a support for the lens to be tested, said support having a rack, of a split lens system on opposite sides of the lens to be tested for aiding in producing an image through the lens, a target including illuminating means operatively and adjustably mounted upon the rack for movement in directions toward and from the lens to be tested, said target being provided with means for causing a definite image to be produced, and including means for rotatably mounting the target, whereby together with the first target adjustment, the image produced through the lens to be tested may be viewed according to the corresponding relation between the target axis and the axis of the lens to be tested.

11. In a lens testing instrument, the combination with a support for the lens to be tested, said support having a rack, of a split lens system on opposite sides of the lens to be tested for aiding in producing an image through the lens, a target including illuminating means operatively and adjustably mounted upon the rack for movement in directions toward and from the lens to be tested, said target being provided with means for causing a definite image to be produced, and including means for rotatably mounting the target, whereby together with the first target adjustment, the image produced through the lens to be tested may be viewed according to the corresponding relation between the target axis and the axis of the lens to be tested, and means for viewing the projected image of the target, said viewing means including a lens having a translucent face located at the image plane of the instrument and having its opposite face formed to magnify the image on the screen face thereof.

CHARLES J. TROPPMAN.